US012565228B2

(12) United States Patent
Bruckner et al.

(10) Patent No.: US 12,565,228 B2
(45) Date of Patent: Mar. 3, 2026

(54) METHOD FOR OPERATING A CONTROL SYSTEM FOR THE AUTOMATED LATERAL CONTROL OF A VEHICLE WITH THE OUTPUT OF HAPTIC FEEDBACK, CONTROL SYSTEM AND DRIVER ASSISTANCE SYSTEM

(71) Applicant: Bayerische Motoren Werke Aktiengesellschaft, Munich (DE)

(72) Inventors: Sebastian Bruckner, Bobingen (DE); Sami Fayad, Munich (DE); Stephan Niermann, Hebertshausen (DE); Dominik Rieth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 17 days.

(21) Appl. No.: 18/847,543

(22) PCT Filed: Mar. 24, 2023

(86) PCT No.: PCT/EP2023/057591
§ 371 (c)(1),
(2) Date: Sep. 16, 2024

(87) PCT Pub. No.: WO2023/186718
PCT Pub. Date: Oct. 5, 2023

(65) Prior Publication Data
US 2025/0222948 A1 Jul. 10, 2025

(30) Foreign Application Priority Data
Mar. 31, 2022 (DE) ..................... 10 2022 107 745.4

(51) Int. Cl.
*B60Q 1/00* (2006.01)
*B60W 10/20* (2006.01)
(Continued)

(52) U.S. Cl.
CPC ............ *B60W 50/16* (2013.01); *B60W 10/20* (2013.01); *B60W 30/143* (2013.01); *B60W 30/18163* (2013.01); *B60W 2556/20* (2020.02)

(58) Field of Classification Search
CPC .... B60W 50/16; B60W 10/20; B60W 30/143; B60W 30/18163; B60W 2556/20;
(Continued)

(56) References Cited

U.S. PATENT DOCUMENTS

2004/0167695 A1 8/2004 Braeuchle et al.
2018/0201315 A1 7/2018 Takamatsu et al.
(Continued)

FOREIGN PATENT DOCUMENTS

DE 102 61 799 A1 7/2004
DE 10 2011 081 320 A1 2/2013
(Continued)

OTHER PUBLICATIONS

International Search Report (PCT/ISA/210) issued in PCT Application No. PCT/EP2023/057591 dated Jul. 6, 2023 with English translation (7 pages).
(Continued)

*Primary Examiner* — Toan N Pham
(74) *Attorney, Agent, or Firm* — Crowell & Moring LLP

(57) ABSTRACT

A method for operating a control system for the automated lateral guidance of a vehicle includes determining a target variable for the automated lateral guidance of the vehicle, determining a manipulated variable for a steering actuator by a controller device, adapting adjustment parameters, which describe a controlled variable of the controller device and/or an output from the steering actuator, for different driving functions of the vehicle, receiving a request signal to output haptic feedback on a steering wheel of the vehicle, outputting a feedback signal for adapting the target variable
(Continued)

for the output of the haptic feedback on the steering wheel during the automated lateral guidance of the vehicle, and adapting the feedback signal and/or the adjustment parameters during the output of the haptic feedback in such a manner that perception of the haptic feedback by a driver is the same irrespective of the driving function of the vehicle.

14 Claims, 5 Drawing Sheets

(51) Int. Cl.
 *B60W 30/14* (2006.01)
 *B60W 30/18* (2012.01)
 *B60W 50/16* (2020.01)
(58) Field of Classification Search
 CPC ........... B60W 2540/18; B62D 15/0255; B62D 6/008; B62D 15/025
 See application file for complete search history.

(56) References Cited

U.S. PATENT DOCUMENTS

| | | | | |
|---|---|---|---|---|
| 2018/0286242 | A1* | 10/2018 | Talamonti | .............. B60K 35/23 |
| 2020/0156704 | A1 | 5/2020 | Albrecht et al. | |
| 2020/0255007 | A1* | 8/2020 | Tsuji | ..................... B60W 50/16 |
| 2020/0269920 | A1* | 8/2020 | Millsap | ................. B60W 50/10 |
| 2021/0323599 | A1 | 10/2021 | Morino et al. | |
| 2022/0081032 | A1 | 3/2022 | Seeland et al. | |

FOREIGN PATENT DOCUMENTS

| | | |
|---|---|---|
| DE | 10 2014 208 785 A1 | 11/2015 |
| DE | 10 2017 202 468 A1 | 8/2018 |
| DE | 10 2017 210 410 A1 | 12/2018 |
| DE | 10 2017 212 780 A1 | 1/2019 |
| DE | 10 2020 211 548 B3 | 12/2021 |

OTHER PUBLICATIONS

German-language Written Opinion (PCT/ISA/237) issued in PCT Application No. PCT/EP2023/057591 dated Jul. 6, 2023 with English translation (10 pages).
German-language Search Report issued in German Application No. 10 2022 107 745.4 dated Nov. 8, 2022 with partial English translation (11 pages).

* cited by examiner

METHOD FOR OPERATING A CONTROL SYSTEM FOR THE AUTOMATED LATERAL CONTROL OF A VEHICLE WITH THE OUTPUT OF HAPTIC FEEDBACK, CONTROL SYSTEM AND DRIVER ASSISTANCE SYSTEM

BACKGROUND AND SUMMARY

The present invention relates to a method for operating a control system for the automated lateral guidance of a vehicle. In addition, the present invention relates to a control system for the automated lateral guidance of a vehicle. Finally, the present invention relates to a driver assistance system for a vehicle having such a control system.

Different driver assistance systems which assist a driver or user with the guidance of the vehicle are known from the prior art. At present, there is interest, in particular, in those driver assistance systems which enable automated lateral guidance of the vehicle. In this context, steering and lane guidance assistants are known, for example, which help to guide the vehicle centrally in the lane and therefore take the pressure off the driver during steering work. Such driver assistance systems for automated lateral guidance usually comprise a corresponding control system and a steering actuator for controlling the steering system of the vehicle.

Provision is usually made for different adjustment parameters to be specified on the basis of the driving function that is currently provided by the driver assistance system. These adjustment parameters may describe both controlled variables of the control system and corresponding outputs from the steering actuator. In this context, DE 10 2014 208 785 A1 discloses a lateral guidance control structure having one or more controlled variables for generating a steering specification for a power-assisted steering system of a vehicle, wherein the lateral guidance control structure is configured such that the steady-state accuracy of one or more controlled variables can be changed using a first variable adjustment parameter that can be specified outside the lateral guidance control structure. The lateral guidance control structure is also configured such that the ability to override the steering specification specified by the lateral guidance control structure with a steering specification from the driver can be changed using a second variable adjustment parameter that can be specified outside the lateral guidance control structure.

The prior art also discloses outputting haptic feedback to the driver or user of a vehicle on the steering wheel. In this respect, DE 10 2017 212 780 A1 describes a method for generating haptic feedback for a vehicle driver, wherein the haptic feedback is generated by applying an additional torque, which alternates around an average total steering torque, to a steering handle of a vehicle by an actuator.

An object of the present invention is to show a solution for how a driver of a vehicle can be assisted as reliably as possible with the guidance of the vehicle by outputting haptic feedback on a steering wheel.

This object is achieved, according to the invention, by a method, a control system and a driver assistance system having the features according to the present disclosure. Advantageous developments of the present invention are also specified in the present disclosure.

A method according to the invention is used to operate a control system for automated lateral guidance of a vehicle. The method comprises determining a target variable for the automated lateral guidance of the vehicle. The method also comprises determining a manipulated variable for a steering actuator by a controller device. The method also comprises adapting adjustment parameters, which describe a controlled variable of the controller device and/or an output from the steering actuator, for different driving functions of the vehicle. The method also comprises receiving a request signal to output haptic feedback on a steering wheel of the vehicle. In addition, the method comprises outputting a feedback signal for adapting the target variable for the output of the haptic feedback on the steering wheel during the automated lateral guidance of the vehicle. Moreover, the method comprises adapting the feedback signal and/or the adjustment parameters during the output of the haptic feedback in such a manner that perception of the haptic feedback by a user is the same irrespective of the driving function of the vehicle.

The method can be carried out using a corresponding control system. This control system may be part of a driver assistance system that can be used to provide different driving functions. During the different driving functions, the automated lateral guidance of the vehicle may be undertaken by the driver assistance system. The driving function may be, for example, a steering and lane guidance assistant, in the case of which the driver is assisted with keeping the vehicle within the lane. The driving function may also be a so-called hands-off function, during which the driver can briefly remove his hands from the steering wheel. The driving function may also be the performance of a lane change maneuver. Furthermore, the driving function may be the performance of a parking maneuver.

The target variable is taken as a basis for the automated lateral guidance of the vehicle. The target variable may be, for example, a target steering angle, a target curvature or a target trajectory. The target variable may also be referred to as a reference variable in the control circuit or the control system. The controller device of the control system is used to determine the manipulated variable for the steering actuator. In this case, the manipulated variable may be determined, in particular, using a comparison of the target variable and an actual variable. The steering actuator may be designed, for example, as an electromotive power-assisted steering system, as an electrohydraulic power-assisted steering system or the like. The steering actuator can be used to move the steerable wheels of the vehicle. During the control of the steerable wheels by the steering actuator, the steering wheel is also moved accordingly. The steering actuator may generate a steering torque which assists the steering movement of the driver or takes effect instead of the steering movement of the driver.

Different adjustment parameters are used in the control system and/or during operation of the steering actuator on the basis of provided driving functions. These adjustment parameters may describe one or more controlled variables of the controller device. Alternatively or additionally, the adjustment parameters may describe an output from the steering actuator. For example, the adjustment parameters may describe a steering torque provided by the steering actuator and/or a temporal profile of the steering torque.

In addition, the control system can be used to provide haptic feedback on the steering wheel. In the present case, a steering wheel should be understood as meaning any steering handle which can be touched or gripped by the user or the driver of the vehicle. The driver can move the steerable wheels of the vehicle by a rotational movement on the steering wheel. If there is a corresponding request signal to output the haptic feedback, the control system can be used to output the feedback signal. As a result of the output of the feedback signal, the target variable can be adapted accordingly and/or the feedback signal can be superimposed on the target variable, with the result that the haptic feedback is output on the steering wheel. The haptic feedback may be, in particular, a jerk, during which the steering wheel is first of all deflected in a first direction and is then moved back in the opposite, second direction. However, provision may also be made for a vibration to be generated as haptic feedback by periodically rotating the steering wheel back and forth. In particular, the feedback signal is determined in such a manner that no steering movement of the vehicle or a deflection of the steerable wheels can be noticed by the driver when outputting the haptic feedback.

As already explained, different adjustment parameters are specified depending on the driving function. This may also result, in particular, in the steering system also having a different feel for the driver, who has his hands on the steering wheel, during the different driving functions provided. If the target variable for the lateral guidance is now adapted on the basis of the feedback signal or if the feedback signal is superimposed on the target variable, this can result, during the different driving functions, in the haptic feedback also having a different feel for the driver during the different driving functions. In the worst case scenario, this may result in the driver being made uncertain by the haptic feedback.

According to the present invention, provision is now made for the feedback signal and/or the adjustment parameters to be adapted during the output of the haptic feedback in such a manner that perception of the haptic feedback by a driver is the same irrespective of the driving function of the vehicle. In other words, provision is made for the haptic feedback, which is output in particular as a jerk on the steering wheel, to always have the same feel for the driver irrespective of which driving function is currently provided by the driver assistance system. In order to achieve this, the adjustment parameters can firstly be adapted at least during the output of the haptic feedback. Alternatively or additionally, provision may be made for the feedback signal itself to be adapted at least during the output of the haptic feedback. This makes it possible to achieve the situation in which the haptic feedback always has the same feel for the driver irrespective of the driving function provided. The perception of the driver or user may relate, in particular, to the movement of the steering wheel during the output feedback. In particular, the perception may relate to a steering torque, a change in the steering torque as a function of time, a change in the steering wheel angle as a function of time or the like. Overall, it is therefore possible to achieve the situation in which the driver can be assisted in a customary manner and without uncertainty by known haptic feedback.

An accuracy of the controlled variable and/or an ability to override a steering specification specified by the steering actuator is/are preferably adapted as adjustment parameters. In other words, the adjustment parameter may be the accuracy of the controlled variable. The accuracy of the controlled variable may describe, in particular, the extent to which an error between the target value of a controlled variable or the reference variable and the actual value of the controlled variable has been adjusted. In particular, the adjustment parameter can be the steady-state accuracy which describes the extent to which the error between the target value and the actual value is adjusted in the steady state.

Furthermore, the adjustment parameter may be the overriding ability or the rigidity. The overriding ability describes, in particular, how easily a steering specification specified by the control system or the steering actuator can be overridden by a steering specification from the driver. This adjustment parameter therefore indicates, in particular, how easy or difficult it is for the driver to suppress the steering specification from the steering actuator. Adapting the accuracy and/or the rigidity at least during the output of the haptic feedback makes it possible to easily and reliably achieve the situation in which the haptic feedback always has the same feel for the driver.

In a further embodiment, when the lateral guidance is deactivated, the automated lateral guidance is activated before outputting the haptic feedback and the automated lateral guidance is deactivated again after outputting the haptic feedback. When the lateral guidance is activated, the haptic feedback is represented using the feedback signal or the offset on the curvature or the steering angle. When the lateral guidance is deactivated, the curvature or the steering angle cannot be adapted. Therefore, provision is made for the automated lateral guidance to be briefly activated when the lateral guidance is deactivated in order to be able to likewise provide the actual variable with the desired offset. If the feedback signal or the haptic feedback is output without activated lateral guidance or if there is a hard switch-on, the feedback has a poor feel for the driver and the intervention in the steering system is noticeable to the driver beyond the feedback. This can be prevented by briefly activating the lateral guidance.

It is also advantageous if the steering actuator is controlled in such a manner that the adjustment parameters and/or the target variable is/are adapted during a ramp-in phase before outputting the haptic feedback and/or during a ramp-out phase after outputting the haptic feedback. This means that the adjustment parameters and/or the target variable or the feedback signal is/are adapted before actually outputting the haptic feedback. The adjustment parameters and/or the target variable, which is/are specified for the currently applicable driving function, can therefore be adapted to the output of the haptic feedback. After the haptic feedback has been output, the adjustment parameters and/or the target variable can then be adapted again for the driving function. During the ramp-in phase and/or during the ramp-out phase, the adjustment parameters and/or the target variable can be increased or reduced continuously or according to a predefined profile. Provision may also be made for a change during the ramp-in phase and the ramp-out phase to be respectively specified for the individual adjustment parameters, the feedback signal and/or the target variable. In particular, provision is made for the adjustment parameters and/or the feedback signal to not change suddenly during the ramp-in phase and the ramp-out phase. It is therefore possible to achieve a transition between the provision of the driving function and the output of the haptic feedback that cannot be noticed by the driver.

If the automated lateral guidance has been deactivated and is activated for the output of the haptic feedback, the jerk as haptic feedback may fuse, for example, with the ramp-in phase and the ramp-out phase to form a whole which is felt to seamlessly result from the non-active steering wheel control and also seamlessly changes to this state again. In other words, the intention is to create the illusion, in particular, that the steering wheel control is not briefly active and a target angle or the target variable has not been specified, but rather has been output via haptic feedback.

In a further embodiment, the feedback signal is selected from a plurality of predetermined feedback signals on the basis of the driving function. In other words, a plurality of feedback patterns can be stored, wherein the appropriate feedback signal can be selected on the basis of the currently active driving function. Different feedback patterns may also be provided for the situation in which the automated lateral guidance is active or has been deactivated.

It is also advantageous if the plurality of feedback signals differ from one another in terms of an intensity and/or a direction of rotation of the steering wheel. The intensity describes, in particular, how strongly the jerk is output on the steering wheel. The intensity may describe the torque produced on the steering wheel and/or the change in torque. The intensity may be set by the driver, for example. The direction of rotation describes the direction in which the jerk is output on the steering wheel or the direction in which the steering wheel is rotated. Furthermore, provision is preferably made for the ramp-in phases and/or the ramp-out phases of the individual adjustment parameters and/or of the target variable to be stored as part of the feedback pattern.

A control system according to the invention for the automated lateral guidance of a vehicle is configured to carry out a method according to the invention and the advantageous configurations thereof. The control system may have the steering actuator which can be used to control the steerable wheels of the vehicle. The control system may also have the control device which can be used to determine the manipulated variable for the steering actuator. Furthermore, the control system may have a storage device which stores the respective feedback patterns or feedback signals.

A driver assistance system according to the invention for a vehicle comprises a control system according to the invention. The driver assistance system is preferably configured to adapt a speed of the vehicle in order to prepare for a lane change maneuver and to output a request signal to output haptic feedback if the lane change maneuver is possible.

In particular, the driver assistance system may be configured to assist the user or driver of the vehicle on a multi-lane road with reaching an exit. In this case, the driver assistance system can prepare for all necessary lane changes until reaching an exit, for example on account of a navigation destination being input. For this purpose, the driver assistance system can first of all identify free gaps for the vehicle in the adjacent lane and can then adapt the speed of the vehicle for the subsequent lane change maneuver into the identified gap. The lane change maneuver itself can be carried out by a lane change assistance system, wherein the lane change assistance system is triggered automatically or after an operating input by the driver.

A vehicle according to the invention comprises a driver assistance system according to the invention. The vehicle is, in particular, in the form of an automobile.

The preferred embodiments and their advantages presented with respect to the method according to the invention accordingly apply to the control system according to the invention, to the driver assistance system according to the invention and to the vehicle according to the invention.

Further features of the invention emerge from the claims, the figures and the description of the figures. The features and combinations of features mentioned in the description above and the features and combinations of features mentioned in the description of the figures below and/or shown in the figures alone can be used not only in the respectively stated combination, but also in other combinations or alone, without departing from the scope of the invention.

The invention is now explained in more detail on the basis of preferred exemplary embodiments and with reference to the accompanying drawings.

DETAILED DESCRIPTION OF THE DRAWINGS

Identical or functionally identical elements are provided with the same reference signs in the figures.

Figure 1:
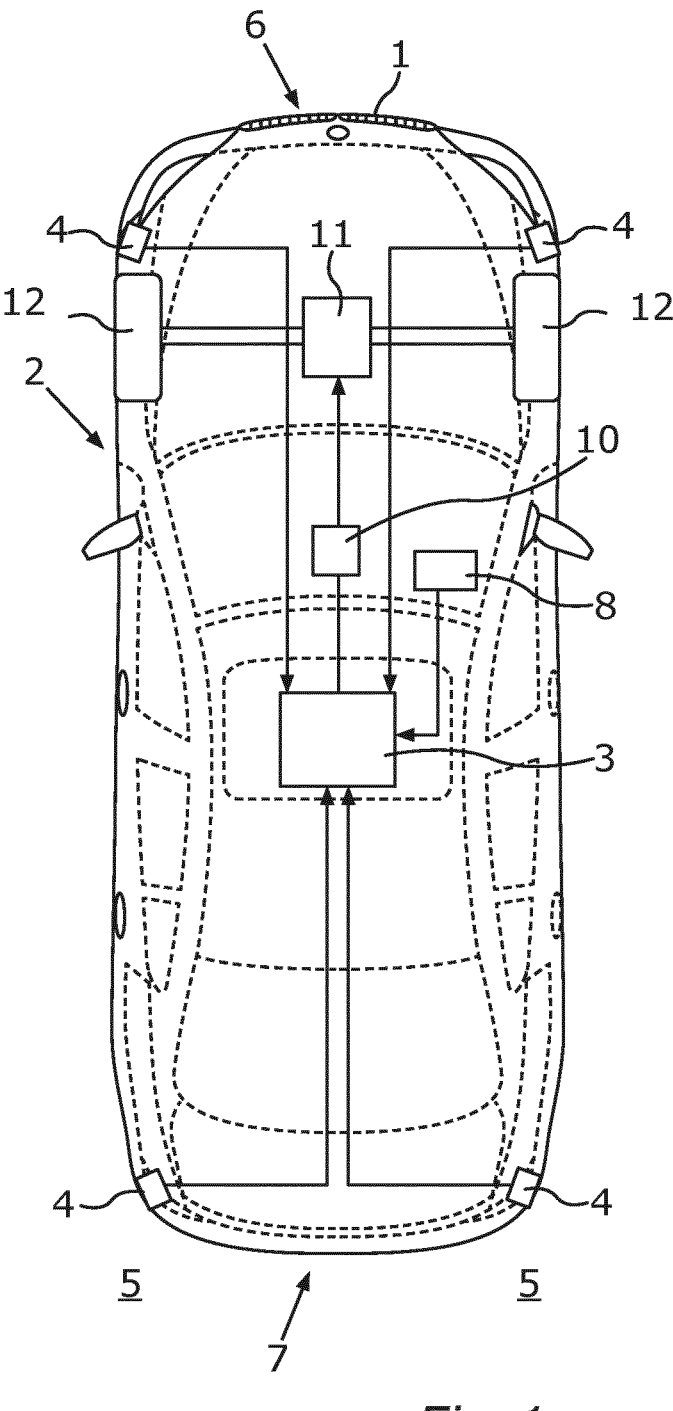
FIG. 1 shows a schematic illustration of a vehicle having a driver assistance system with a control system for the automated lateral guidance of the vehicle.

FIG. 1 shows a plan view of a vehicle 1 which is in the form of an automobile. The vehicle 1 comprises a driver assistance system 2 which can be used to assist a driver of the vehicle 1, in particular when maneuvering the vehicle 1 on a multi-lane road. The driver assistance system 2 comprises a computing device 3 which may be formed, for example, by at least one electronic control unit of the vehicle 1.

In addition, the driver assistance system 2 comprises at least one environmental sensor 4 or distance sensor. In the present example, the driver assistance system 2 comprises four environmental sensors 4, two environmental sensors 4 of which are arranged in a front region 6 of the vehicle 1 and two environmental sensors 4 of which are arranged in a rear region 7 of the vehicle 1. In the example shown, the environmental sensors 4 are arranged in the respective corners of the vehicle 1. The environmental sensors 4 may be in the form of radar sensors, for example. The environmental sensors 4 can be used to carry out appropriate measurements in order to be able to detect objects and in particular further road users in an environment 5 of the vehicle 1.

In addition, the driver assistance system 2 comprises a navigation device 8 which can be used, in a known manner, to output navigation instructions during the journey of the vehicle 1. The driver assistance system 2 can be used to assist the driver of the vehicle 1, in particular on a multi-lane road, with reaching an exit. On the basis of a signal from the navigation device 8, the driver assistance system 2 can prepare for all necessary lane changes until reaching an exit. For this purpose, the driver assistance system 2 can respectively identify free gaps for the vehicle 1 in an adjacent lane and can adapt the speed of the vehicle 1 accordingly for the subsequent lane change maneuver. Provision may also be made for the lane change maneuver to be carried out by the driver assistance system 2.

In addition, the driver assistance system 2 comprises a control system 9 which is illustrated only schematically in the present case and can be used to enable automated lateral guidance of the vehicle. The control system 9 comprises a controller device 10 which can be used to specify a manipulated variable for a steering actuator 11 of the control system. The steering actuator 11 can be used to control the steerable wheels 12 of the vehicle 1. The control system 9 can be used to provide control to a target variable L. In addition, haptic feedback can be output to the driver of the vehicle, who currently has his hands on the steering wheel of the vehicle 1. This haptic feedback can be output, for example, if it is identified by the driver assistance system 2 that a lane change to the adjacent lane is possible.

Figure 2:
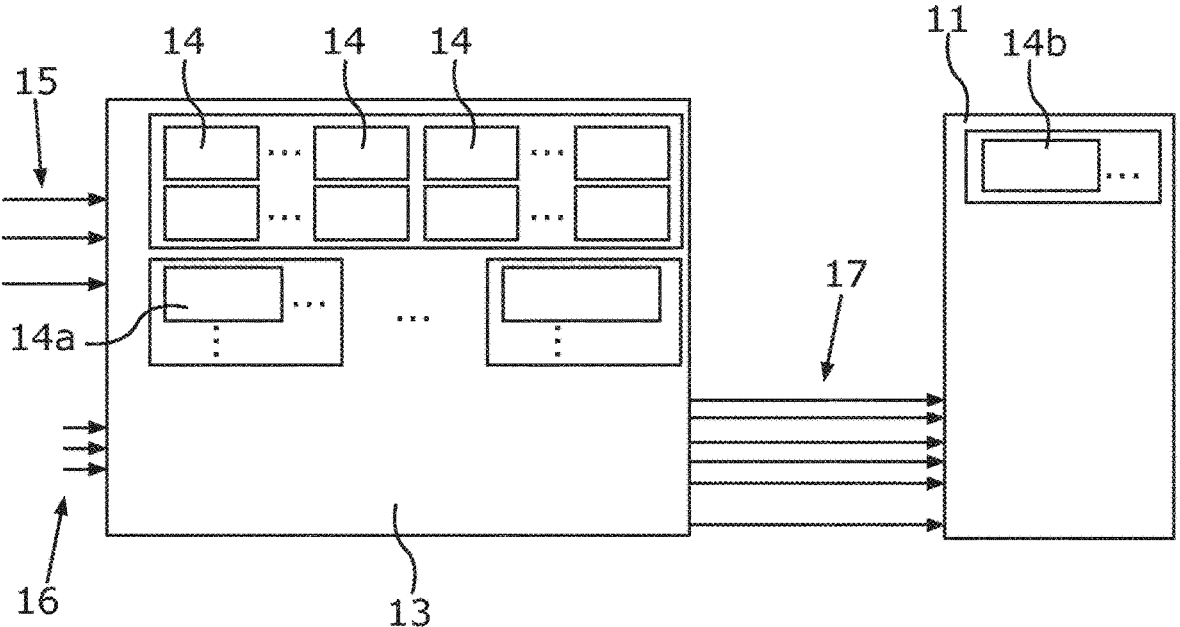
FIG. 2 shows a schematic illustration of a computing device and of a steering actuator of the control system.

FIG. 2 shows a schematic illustration of the method of operation of the control system 9 for the purpose of generating the haptic feedback. A coordination unit 13 which may be formed, for example, by the computing device 3 and/or the controller device 10 is illustrated in this case. The coordination unit 13 or a memory of the coordination unit 13 stores different feedback signals 14 for outputting the haptic feedback on the steering wheel. In this case, provision is made for the haptic feedback to be output as a jerk on the steering wheel. These feedback signals 14 may differ in terms of the direction of rotation and/or the intensity. In the present example, further feedback signals 14a for outputting respective haptic feedback are stored in a further feedback pattern cluster. The steering actuator 11 can then be controlled on the basis of the feedback signals 14 and the further feedback signals 14b. Provision may also be made for a feedback signal 14b to be directly specified in the steering actuator 11.

The coordination unit 13 may be provided with corresponding input signals which describe a request signal for the haptic feedback, the intensity and the direction of rotation. This is illustrated in the present case by the arrows 15. In addition, the coordination unit 13 may be supplied with information describing the desired curve progression during activated lateral guidance and activated driving functions. This is schematically illustrated in the present case by the arrows 16. The corresponding feedback signal 14 can then be selected on the basis of these specifications or input variables. This can then be used to control the steering actuator 11. In addition, the coordination unit 13 can transmit further information to the steering actuator 11, this information describing, for example, the target variable L, a qualifier Q, adjustment parameters S, G, a maximum lateral acceleration or the like. A maximum lateral acceleration may also be specified and/or the lateral guidance function may be defined as further examples for controlling the steering actuator 11.

Figure 3:
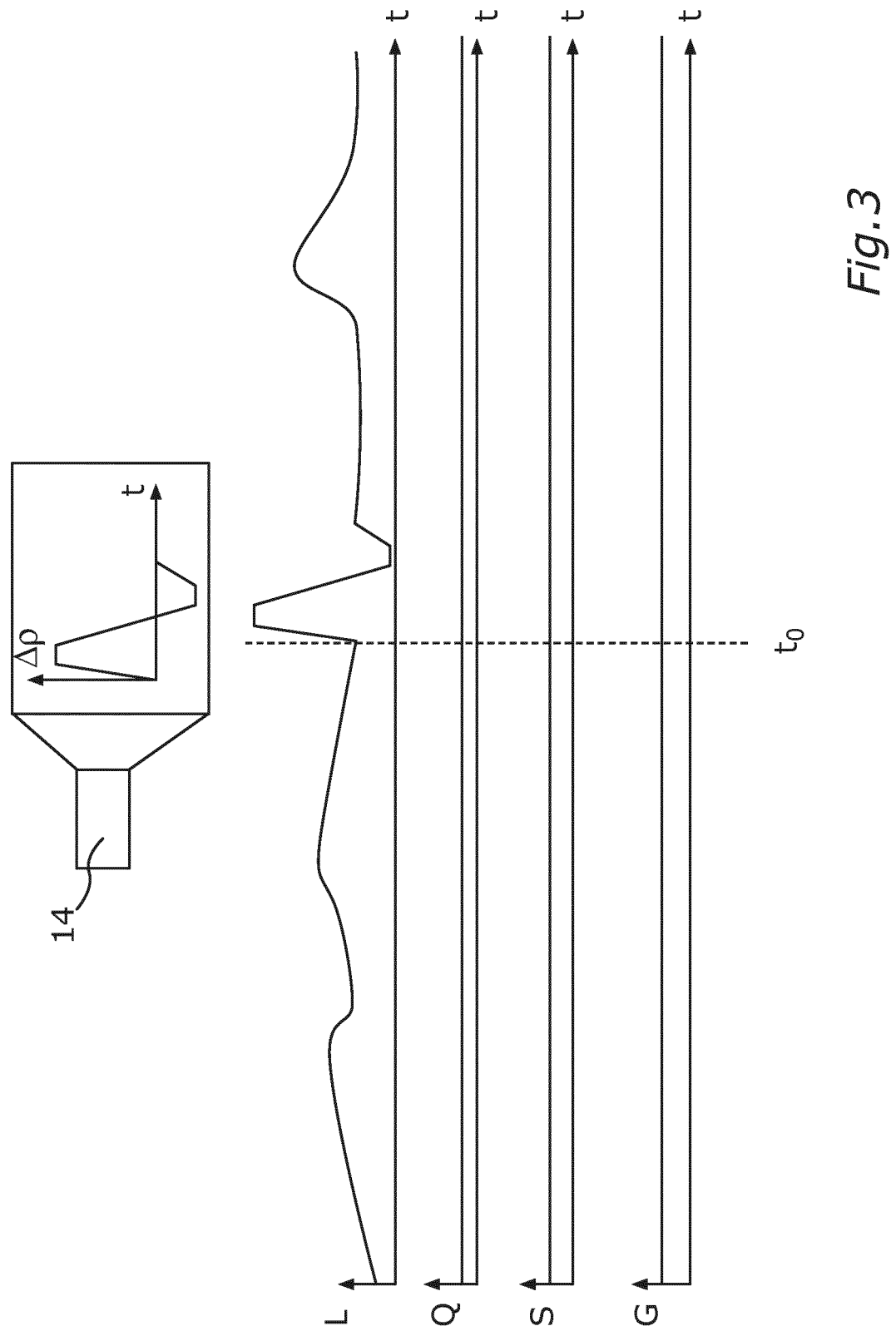
FIG. 3 shows temporal profiles of a target variable and of adjustment parameters during active lateral guidance according to a first embodiment.

The upper region of FIG. 3 shows a temporal profile of a feedback signal 14. In this case, the time t is plotted on the abscissa and the angle offset $\Delta\varphi$ is plotted on the ordinate. In the case of this feedback signal 14, the steering system of the vehicle 1 is controlled in such a manner that a jerk to the right can be perceived on the steering wheel and the steering wheel is then rotated to the left again. In this case, the steering system is controlled in such a manner that only haptic feedback can be perceived by the driver on the steering wheel, but no perceptible deflection of the wheels 12 is performed.

The temporal profile of the target variable L, of the qualifier Q, of the rigidity S and of the accuracy G is also plotted in FIG. 3. The target variable S may describe, for example, a target curvature or a target steering angle. The qualifier Q indicates whether the control system 9 is activated and the automated lateral guidance is therefore implemented. The rigidity S describes an ability of the driver to override the steering specification specified by the steering actuator 11. The accuracy G of a controlled variable describes the extent to which an error between the target variable L and the actual variable of the controlled variable has been adjusted in the steady state. The example from FIG. 3 describes the situation in which the automated lateral guidance is active, but the adjustment parameter rigidity S and accuracy G are not adapted. The haptic feedback is requested at a time $t_0$. The feedback signal 14 is then superimposed on the target variable L here or the feedback signal 14 is output instead of the target variable L.

Figure 4:
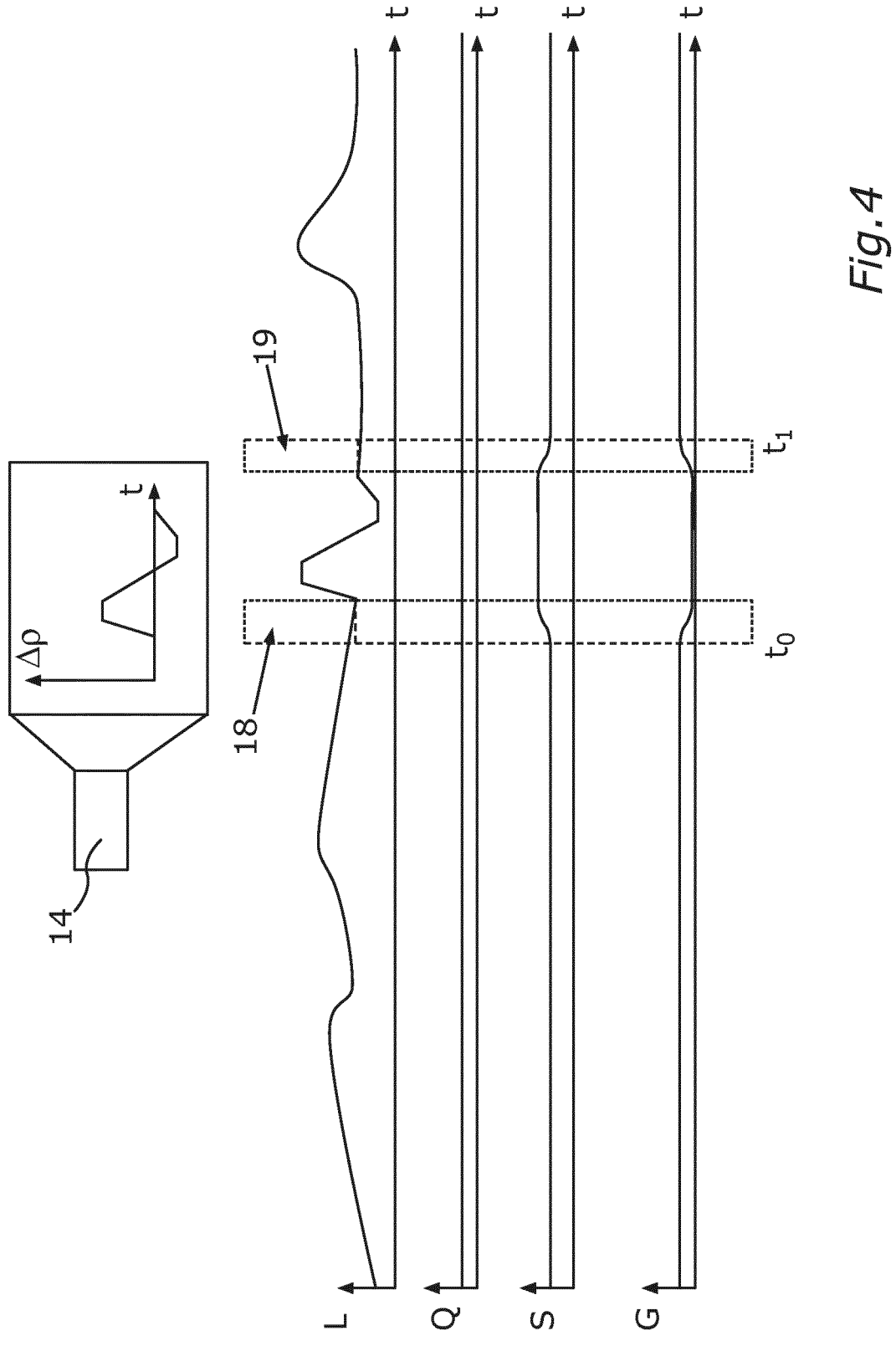
FIG. 4 shows temporal profiles of the target variable and of the adjustment parameters when the lateral guidance is activated according to a further embodiment.

In comparison with this, FIG. 4 describes, in the schematic illustration, the active automated lateral guidance with adapted rigidity S and accuracy G. Here too, the corresponding feedback signal 14 and the temporal profile of the feedback signal 14 are illustrated. In this case, provision is made for both the rigidity S and the accuracy G to be adapted during the output of the haptic feedback. In the example shown, the rigidity S stipulated by the driving function is increased during the output of the haptic feedback. In addition, the accuracy G specified by the driving function is reduced, for example, during the output of the haptic feedback. The rigidity S, the accuracy G and/or the target variable L is/are specified during the output of the haptic feedback in such a manner that the haptic feedback always has the same feel for the driver on the steering wheel irrespective of the driving function provided.

In addition, a ramp-in phase 18 and a ramp-out phase 19 are provided, during which the adjustment parameters G, S and/or the target variable L is/are continuously changed. Provision may also be made for the profiles of the adjustment parameters and of the target variable L during the ramp-in phase 18 and the ramp-out phase 19 to be stored in the feedback signal 14. The ramp-in phase 18 begins at the time to and the ramp-out phase 19 ends at the time $t_1$.

Figure 5:
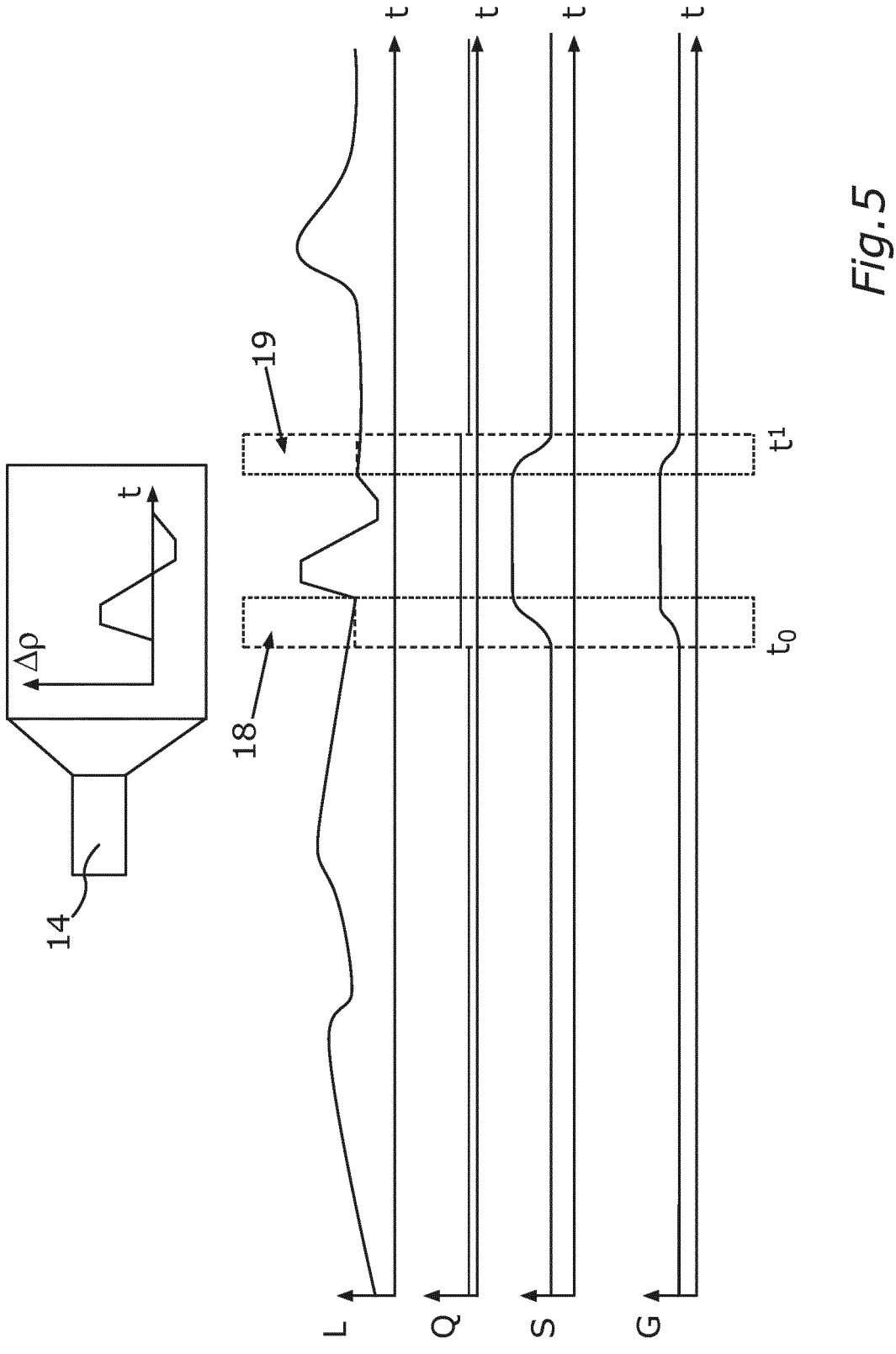
FIG. 5 shows temporal profiles of the target variable and of the adjustment parameters when the lateral guidance is deactivated.

FIG. 5 describes, in the schematic illustration, a variant in which the automated lateral guidance is initially deactivated. However, the automated lateral guidance is activated in order to provide the haptic feedback. This can be seen from the profile of the qualifier Q. The temporal profile of the associated feedback signal 14 is also shown in FIG. 5. In this example, both the rigidity S and the accuracy G are increased during the output of the haptic feedback. In this case, provision is made, in particular, for the jerk as an example of feedback to fuse with the ramp-in phase 18 and the ramp-out phase 19. This results in the illusion for the driver that the feedback seamlessly results from the non-active steering wheel control and also seamlessly changes to this state again. In other words, the intention is to produce the illusion that the steering wheel control has not set the target variable L, but rather has presented only haptic feedback.

The invention claimed is:

1. A method for operating a control system for automated lateral guidance of a vehicle, comprising:
   determining a target variable for the automated lateral guidance of the vehicle;
   determining a manipulated variable for a steering actuator by a controller device;
   adapting adjustment parameters, which describe a controlled variable of the controller device and/or an output from the steering actuator, for different driving functions of the vehicle;
   receiving a request signal to output haptic feedback on a steering wheel of the vehicle;
   outputting a feedback signal for adapting the target variable for the output of the haptic feedback on the steering wheel during the automated lateral guidance of the vehicle; and
   adapting the feedback signal and/or the adjustment parameters during the output of the haptic feedback in such a manner that perception of the haptic feedback by a driver is the same irrespective of the driving function of the vehicle.

2. The method according to claim 1, comprising:
   adapting an accuracy of the controlled variable and/or an ability to override a steering specification specified by the steering actuator as adjustment parameters.

3. The method according to claim 1, comprising:

activating the automated lateral guidance before outputting the haptic feedback when the lateral guidance is deactivated; and deactivating the automated lateral guidance after outputting the haptic feedback.

4. The method according to claim 1, comprising:

controlling the steering actuator such that the adjustment parameters and/or the target variable is/are adapted during a ramp-in phase before outputting the haptic feedback and/or during a ramp-out phase after outputting the haptic feedback.

5. The method according to claim 1, comprising:

selecting the feedback signal from a plurality of predetermined feedback signals on a basis of the driving function.

6. The method according to claim 5, wherein the plurality of feedback signals differ from one another in terms of an intensity and/or a direction of rotation of the steering wheel.

7. A control system for automated lateral guidance of a vehicle, wherein the control system is configured to:

determine a target variable for the automated lateral guidance of the vehicle;

determine a manipulated variable for a steering actuator by a controller device;

adapt adjustment parameters, which describe a controlled variable of the controller device and/or an output from the steering actuator, for different driving functions of the vehicle;

receive a request signal to output haptic feedback on a steering wheel of the vehicle;

output a feedback signal for adapting the target variable for the output of the haptic feedback on the steering wheel during the automated lateral guidance of the vehicle; and adapt the feedback signal and/or the adjustment parameters during the output of the haptic feedback in such a manner that perception of the haptic feedback by a driver is the same irrespective of the driving function of the vehicle.

8. The control system according to claim 7, wherein the control system is configured to:

adapt an accuracy of the controlled variable and/or an ability to override a steering specification specified by the steering actuator as adjustment parameters.

9. The control system according to claim 7, wherein the control system is configured to:

activate the automated lateral guidance before outputting the haptic feedback when the lateral guidance is deactivated; and deactivate the automated lateral guidance after outputting the haptic feedback.

10. The control system according to claim 7, wherein the control system is configured to:

control the steering actuator such that the adjustment parameters and/or the target variable is/are adapted during a ramp-in phase before outputting the haptic feedback and/or during a ramp-out phase after outputting the haptic feedback.

11. The control system according to claim 7, wherein the control system is configured to:

select the feedback signal from a plurality of predetermined feedback signals on a basis of the driving function.

12. The control system according to claim 11, wherein the plurality of feedback signals differ from one another in terms of an intensity and/or a direction of rotation of the steering wheel.

13. A driver assistance system for a vehicle, comprising:

the control system according to claim 7.

14. The driver assistance system according to claim 13, wherein the driver assistance system is configured to:

adapt a speed of the vehicle in order to prepare for a lane change maneuver; and output a request signal to output haptic feedback in response to the lane change maneuver being possible.

\* \* \* \* \*